(12) United States Patent
Muthiah

(10) Patent No.: US 12,423,238 B2
(45) Date of Patent: Sep. 23, 2025

(54) PROACTIVE CACHING OF DATA FOR ACCELERATOR CORES IN A STORAGE DEVICE

(71) Applicant: SANDISK TECHNOLOGIES, INC., Milpitas, CA (US)

(72) Inventor: Ramanathan Muthiah, Bangalore (IN)

(73) Assignee: SANDISK TECHNOLOGIES, INC., Milpitas, CA (US)

(*) Notice: Subject to any disclaimer, the term of this patent is extended or adjusted under 35 U.S.C. 154(b) by 55 days.

(21) Appl. No.: 18/232,040

(22) Filed: Aug. 9, 2023

(65) Prior Publication Data

US 2024/0273027 A1 Aug. 15, 2024

Related U.S. Application Data

(60) Provisional application No. 63/444,717, filed on Feb. 10, 2023.

(51) Int. Cl.
*G06F 12/0842* (2016.01)
*G06F 12/0877* (2016.01)

(52) U.S. Cl.
CPC ...... *G06F 12/0842* (2013.01); *G06F 12/0877* (2013.01); *G06F 2212/1021* (2013.01)

(58) Field of Classification Search
CPC ............ G06F 12/0842; G06F 12/0862; G06F 12/0868; G06F 12/0877; G06F 2212/1021; G06F 2212/502; G06F 2212/6026
See application file for complete search history.

(56) References Cited

U.S. PATENT DOCUMENTS

| | | | |
|---|---|---|---|
| 10,909,039 B2 | 2/2021 | Vemulapalli | |
| 11,194,723 B2 | 12/2021 | Saeki | |
| 11,231,930 B2 | 1/2022 | Gu | |
| 2018/0300258 A1 | 10/2018 | Wokhlu | |
| 2019/0138451 A1* | 5/2019 | Alam | G06F 12/0862 |
| 2021/0149805 A1 | 5/2021 | de Abreu Pinho | |
| 2021/0390053 A1* | 12/2021 | Roberts | G06F 9/30047 |
| 2023/0027178 A1* | 1/2023 | Shah | G06F 12/1466 |

* cited by examiner

*Primary Examiner* — Aracelis Ruiz
(74) *Attorney, Agent, or Firm* — Arlene Neal; NEAL BLIBO LLC

(57) ABSTRACT

A storage device may optimize pre-cache operations based on patterns associated with previously received data requests from accelerator cores in the storage device. The storage device may also optimize pre-cache operations by analyzing the usage of cache data by the accelerator cores. The accelerator cores may perform computational storage functions. The storage device may also include a storage core to receive data requests from an accelerator core to access data stored on a memory device. The storage core may learn a request pattern associated with the data requests and analyze usage of previously cached data by the accelerator core. The storage device may use the request pattern and the usage of previously cached data to optimize its pre-cache operations.

20 Claims, 7 Drawing Sheets

PROACTIVE CACHING OF DATA FOR ACCELERATOR CORES IN A STORAGE DEVICE

CROSS-REFERENCE TO RELATED APPLICATION

The present application claims the benefit of U.S. Provisional Application Ser. No. 63/444,717 titled "PROACTIVE CACHING OF DATA FOR ACCELERATOR CORES IN A STORAGE DEVICE," filed Feb. 10, 2023, which is incorporated by reference herein in their entirety.

BACKGROUND

Data pre-caching is a technique used in storage devices to proactively store or cache data in a temporary storage location so that data associated with anticipated future requests can be accessed more quickly. Typically, requests from a host for data stored in flash memory are latency oriented because of the time it takes to retrieve the requested data from the flash memory. A controller associated with a storage device may perform pre-caching of data to reduce latency, wherein the controller may prefetch data from the flash memory and store the prefetched data in, for example, random-access memory (RAM) that can be accessed faster than the flash memory. The controller may typically pre-cache data based on an access pattern. For example, if the host requests data associated with addresses one to one hundred, the controller may pre-cache data associated with addresses one-hundred-and-one to two hundred in anticipation of future requests from the host. If the host does request the pre-cached data, the controller may send the pre-cached data to the host faster by retrieving it from the RAM, thereby reducing latency and improving quality of service. On the other hand, if the host does not request the pre-cached data, data thrashing occurs, causing the controller to swap the unused pre-cached data for other data requested by the host, thereby wasting system resources and energy.

Accelerator cores are typically processors that have been specially optimized to perform specific functions or computations and accelerator cores may be integrated into a storage device. To manage the finite bandwidth and resources of the storage device, a mechanism for efficiently pre-caching data for the accelerator cores may be desirable.

SUMMARY

In some implementations, a storage device may include a memory device to store data and multiple accelerator cores to perform computational storage functions. The storage device may also include a storage core to receive data requests from an accelerator core to access data stored on the memory device. The storage core may learn a request pattern associated with the data requests, analyze the usage of previously cached data by the accelerator core, and optimize pre-cache operations based on the request pattern and the usage of previously cached data associated with the accelerator core.

The storage device may further include a controller to control operations for one or more components of the storage core, control interactions between the plurality of accelerator cores and the storage core, and manage writing data to the device memory.

In some implementations, a method for generating pre-cache requests for data stored on a memory device in a storage device includes transmitting, by an accelerator core to a storage core in the storage device, data requests to access data stored on the memory device, wherein the accelerator core is one of a plurality of accelerator cores to perform computational storage functions. The method also includes receiving, by the storage core, the data requests from the accelerator core; learning by the storage core, a request pattern associated with the data requests; and analyzing, by the storage core, usage of previously cached data by the accelerator core. The method further includes optimizing, by the storage core, pre-cache operations based on the request pattern and the usage of previously cached data associated with the accelerator core and generating pre-cache requests using optimized pre-cache operations.

Figure 1:
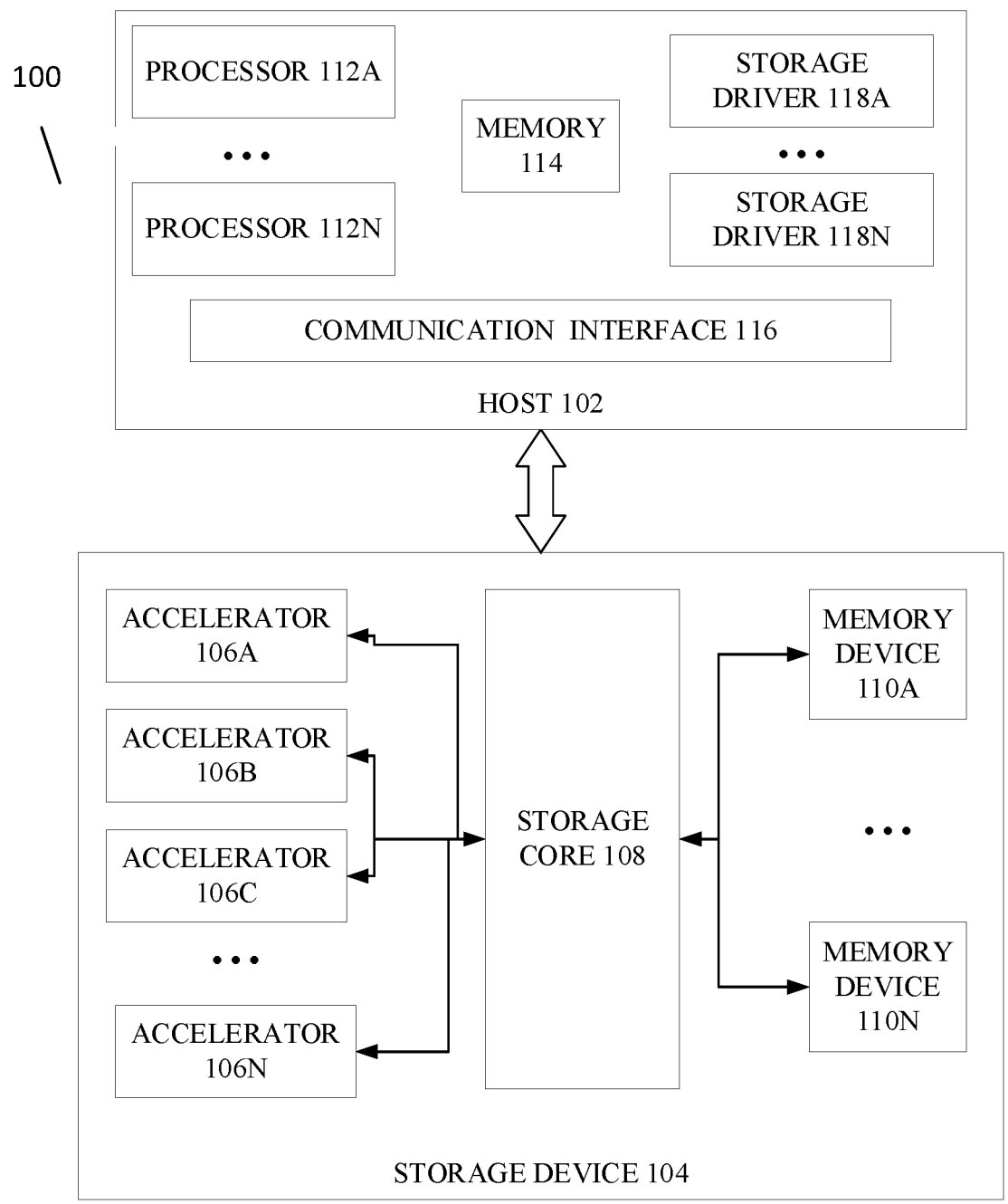
FIG. 1 is a schematic block diagram of an example system in accordance with an embodiment of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with an embodiment of the disclosure. System 100 includes a host 102 and a storage device 104. The host 102 may include one or more processors 112a-112n (referred to herein as processor(s) 112) which may be, for example, one or more central processing units, one or more general-purpose processors, one or more application-specific processors, one or more virtual processors, one or more processor cores, or the like. Host 102 may also include volatile memory 114 and a communication interface 116. Communication interface 116 may include one or more network interfaces configured to communicatively couple host 102 and storage device 104. In an implementation, communication interface 116 may include management and input/output (I/O) interfaces through which host 102 may use one or more computational storage functions being executed on storage device 104. Hosts 102 may include one or more computational storage drivers 118a-118n (referred to herein as storage driver(s) 118) to download and/or activate one or more computational storage functions on storage device 104.

Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may be a computational storage device that may execute computational storage functions (i.e., a set of computational operations executed on storage device 104). Storage device 104 may include one or more accelerator cores 106a-106n (referred to herein as accelerator core(s) 106), one or more storage cores 108, and one or more memory devices 110a-110n (referred to herein as memory device(s) 110).

Accelerator cores 106 may be processors to process data and/or perform computational storage functions at the storage device 104 level and deliver application performance and results from storage device 104, without requiring all data to be exported from storage device 104 to processor 112 for analysis and/or computation. For example, accelerator cores 106 may execute machine learning functions, data compression functions, data encryption functions, video processing, or perform any type of data processing and/or computation within storage device 104. Data retrieved from storage device 104 and processed by accelerator cores 106 in storage device 104 typically require fewer resources than data retrieved from storage device 104 and processed by a processor outside of storage device 104.

Memory devices 110 may be, for example, non-volatile memory devices such as one or more flash memory devices and/or other persistent data storage. Accelerator cores 106 may include an interface to storage core 108 to transmit requests to access data being stored on memory devices 110 and to receive data requested from memory devices 110. Storage core 108 may include finite bandwidth and resources and may not be able to perform pre-cache operations for requests received from multiple accelerator cores 106. As such, to support requests from multiple accelerator cores 106 in the most efficient manner, storage core 108 may execute a mechanism to learn patterns associated with requests received from accelerator cores 106 and analyze the usage of previously cached data by accelerator cores 106. Based on the learned patterns and usage analysis, storage core 108 may optimize its pre-cache operations to efficiently use its finite resources when pre-caching data for accelerator cores 106. This may increase the operational speed in storage device 104 for computations performed by accelerator cores 106. As indicated above FIG. 1 is provided as an example. Other examples may differ from what is described in FIG. 1.

Figure 2:
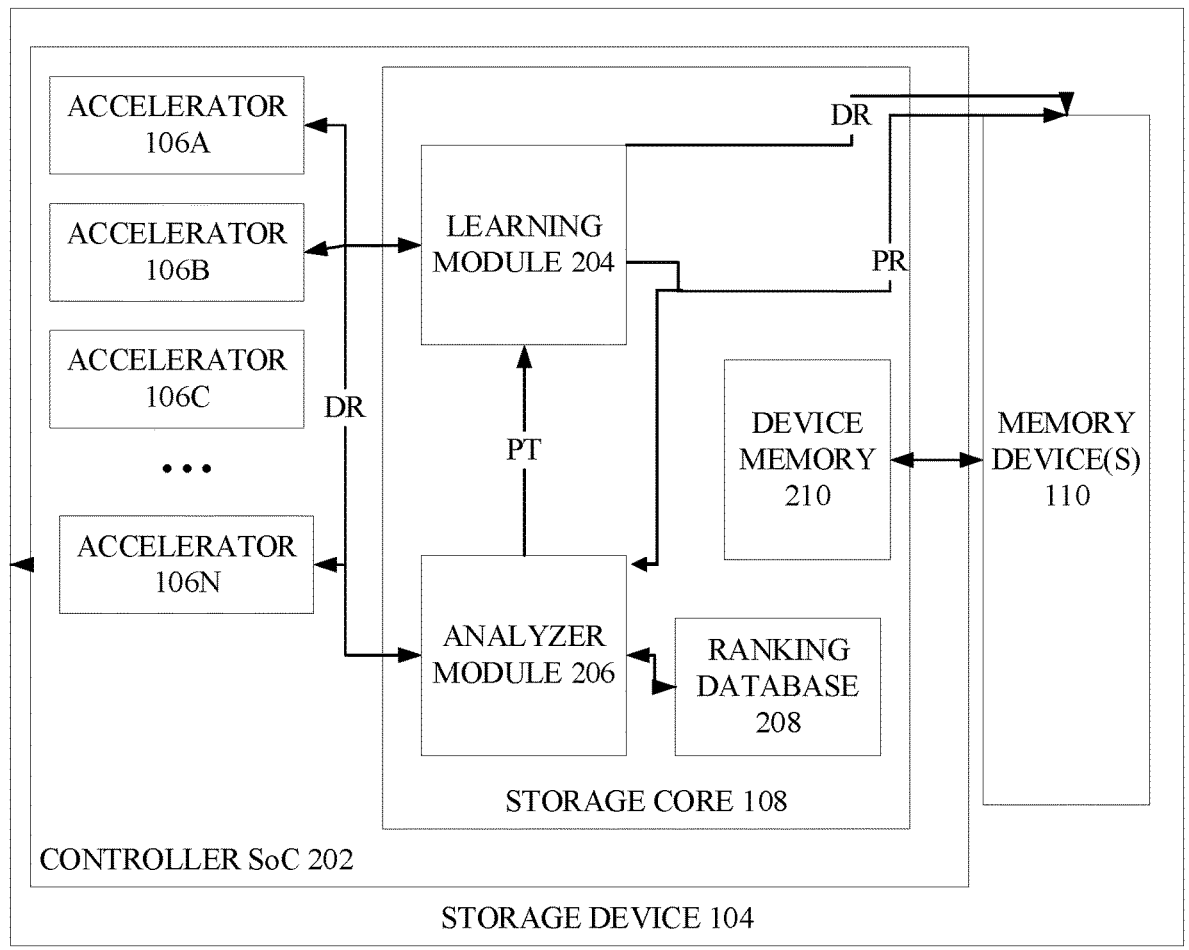
FIG. 2 is a schematic block diagram of an example storage device in accordance with an embodiment of the disclosure.

FIG. 2 is a schematic block diagram of an example storage device in accordance with an embodiment of the disclosure. Storage device 104 may include a learning module 204, an analyzer module 206, a ranking database 208, and a volatile device memory 210. Storage device 104 may also include a controller system on chip (SoC) 202 that may control the operations of one or more components of storage core 108, interactions between accelerator cores 106 and storage core 108, and/or manage writing data to volatile device memory 210, which may be for example, random-access memory (RAM).

To retrieve data stored in non-volatile memory device 110, a requesting accelerator core 106 may send data requests (denoted as DR in FIG. 2) to learning module 204 and analyzer module 206. The data requests may include requests for data stored in one or more blocks on non-volatile memory device 110. Learning module 204 may forward the data requests to non-volatile memory device 110 to retrieve the data and may transmit the retrieved data to the requesting accelerator core 106. Learning module 204 may transmit data requests to non-volatile memory device 110 for data that is not cached in volatile device memory 210. If a data request is for data stored in volatile device memory 210, controller 202 may retrieve the data from volatile device memory 210 and transmit the retrieved data to the requesting accelerator core 106.

Learning module 204 may also use the data requests received from the requesting accelerator core to determine a request pattern associated with the data requests. Learning module 204 may further use the data requests received from the requesting accelerator core to determine a hot region (i.e., logical areas in memory devices 110 that are likely to be associated with future requests from the requesting accelerator core). Learning module 204 may thus track address ranges from data requests of different requesting accelerator cores 106 and may determine command grouping or spacing for randomly accessed data. Learning module 204 may use the group information to prefetch data for storage in volatile device memory 210 or to perform read look ahead for logical data and/or corresponding control data associated with data requests received from accelerator cores 106.

Consider an example where learning module 204 receives data requests from accelerator core 106a for blocks of data in non-volatile memory device 110. A first data request from accelerator core 106a may be for data associated with addresses 200-300 in non-volatile memory device 110; a second data request may be for data associated with addresses 400-500; and a third data request may be for data associated with addresses 600-700. In addition to forwarding the data requests to non-volatile memory device 110 to retrieve the requested data and transmit the retrieved data to accelerator core 106a, learning module 204 may use the second and/or third data requests received from accelerator core 106a to determine that the request pattern of the data requests involves retrieving data associated with one hundred addresses and skipping data associated with the next one hundred addresses. Using the request pattern, learning module 204 may determine that the hot region for accelerator core 106a (i.e., logical areas in the non-volatile memory device 110 that are likely to be associated with a future request from accelerator core 106a) is associated with addresses 800-900 in the non-volatile memory device 110. Learning module 204 may use this information to transmit a pre-cache request (denoted in FIG. 2 as PR) to non-volatile memory device 110 or perform a read look ahead for data associated with addresses 800-900 in non-volatile memory device 110. Upon receiving data associated with addresses 800-900 from non-volatile memory device 110 in response to the pre-cache request, controller 202 may store the data in volatile memory device 210. Thereafter, if learning module 204 and analyzer module 206 receive a fourth data request from accelerator core 106a and if that data request is for the data associated with addresses 800-900, the requested data may be retrieved from volatile memory device 210 at a quicker speed than it would be retrieved from non-volatile memory device 110.

Learning module 204 may also transmit the pre-cache request to analyzer module 206. Analyzer module 206 may evaluate data requests received from accelerator cores 106 to determine if a data request is for pre-cached data. For example, analyzer module 206 may evaluate the fourth data request received from accelerator core 106a to determine if the fourth data request is for data in a pre-cache request previously received from learning module 204.

Analyzer module 206 may determine that an incoming data request from an accelerator core 106 is a full hit or partial hit if the data request is for a full set of data or a partial set of data in a previously received pre-cache request. Analyzer module 206 may determine that the incoming data request is a miss if the data request is not for data in a previously received pre-cache request. In some embodiments, analyzer module 206 may use the n most recently received pre-cache requests in determining whether an incoming data request is a hit or miss, wherein n is an integer and is determined based on the resources of storage device 104. Accordingly, if, for example, the fourth data request from accelerator core 106a is for data associated with addresses 800-900 pre-cached in volatile memory device 210, analyzer module 206 may determine that the fourth data request is a full hit. If, on the other hand, the fourth data request from accelerator core 106a is not for data associated with addresses 800-900 pre-cached in volatile memory device 210, analyzer module 206 may determine that the fourth data request is a miss. When the fourth data request is determined to be a miss, controller 202 may retrieve the data for the fourth data request directly from non-volatile memory device 110 and may thrash data associated with addresses 800-900 pre-cached in volatile memory device 210, thereby wasting system resources.

Analyzer module 206 may also determine a hit ratio associated with an accelerator core 106. The hit ratio may be the number of hits associated with data requests received from the accelerator core 106. For example, analyzer module 206 may calculate the hit ratio associated with accelerator core 106a using the data requests received from accelerator core 106a and the n most recently received pre-cache request(s), may calculate the hit ratio associated with accelerator core 106b using the data requests received from accelerator core 106b and the n most recently received pre-cache request(s), may calculate the hit ratio associated with accelerator core 106c using the data requests received from accelerator core 106c and the n most recently received pre-cache request(s), and so on, wherein n is an integer and is determined based on the resources of storage device 104.

Using the hit ratio associated with an accelerator core 106, analyzer module 206 may rank an accelerator core 106 and may store its ranking in ranking database 208. Analyzer module 206 may also calculate the hit ratio and/or ranking for an accelerator core 106 using a weighted moving window, wherein a higher weight may be given to a more recent (newer) hit than an older hit. The rankings may dynamically change as the learning of data requests from any accelerator core improves or degrades. As such, analyzer module 206 may continue to update ranking database 208 to reflect changes in the hit ratios associated with accelerator cores 106.

Analyzer module 206 may transmit a pre-cache trigger (denoted as PT in FIG. 2) to learning module 204, wherein the pre-cache trigger is associated with the n highest-ranked accelerator cores and n is an integer determined based on the available resources of storage device 104. Consider an example where accelerator core 106c has the highest hit ratio, accelerator core 106a has the next highest hit ratio, and accelerator core 106b has the third highest hit ratio, analyzer module 206 may store the rankings of these hit ratios in the ranking database 208. Depending on the limitations of the resources in storage device 104, analyzer module 206 may transmit pre-cache trigger(s) for one or more accelerator cores 106 to learning module 204. Storage core 108 may use the pre-cache trigger to prioritize pre-caching for accelerator cores 106.

In this example, depending on the limitations of the resources of the storage device 104, analyzer module 206 may transmit a pre-cache trigger for accelerator core 106c, the accelerator core determined to have the highest hit ratio. Storage core 108 may use the pre-cache trigger to prioritize pre-cache requests for accelerator core 106c over the other accelerator cores. In another example, if the resources on storage core 108 can support pre-caching data for two accelerator cores, the pre-cache trigger(s) may be associated with accelerator core 106c and accelerator core 106a, the two most highly ranked accelerator cores. Storage core 108 may use the pre-cache trigger to prioritize pre-cache requests for accelerator core 106c and accelerator core 106a over the other accelerator cores. In other words, storage core 108 may analyze incoming data requests from accelerator cores 106 and optimize the backend and flash resource usage based on thrash ratios associated with accelerator cores 106.

Using the pre-cache trigger(s) from analyzer module 206 and request patterns for data requests received from accelerator cores 106, learning module 204 may continue to learn to pre-cache appropriate logical data for accelerator cores 106. As such, storage core 108 may choose the best fit pre-cache candidates among multiple accelerator core requests and may pre-cache the best fit logical data and/or corresponding control data associated with the data requests from accelerator cores 106.

Storage device 104 may perform these processes based on a processor, for example, controller 202 executing software instructions stored by a non-transitory computer-readable medium, such as storage component 210. As used herein, the term "computer-readable medium" refers to a non-transitory memory device. Software instructions may be read into storage component 210 from another computer-readable medium or from another device. When executed, software instructions stored in storage component 210 may cause controller 202 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, storage device 104 may include additional components, fewer components, different components, or differently arranged components than those shown in FIG. 2. Additionally, or alternatively, a set of components (e.g., one or more components) of storage device 104 may perform one or more functions described as being performed by another set of components of storage device 104.

Figure 3A:
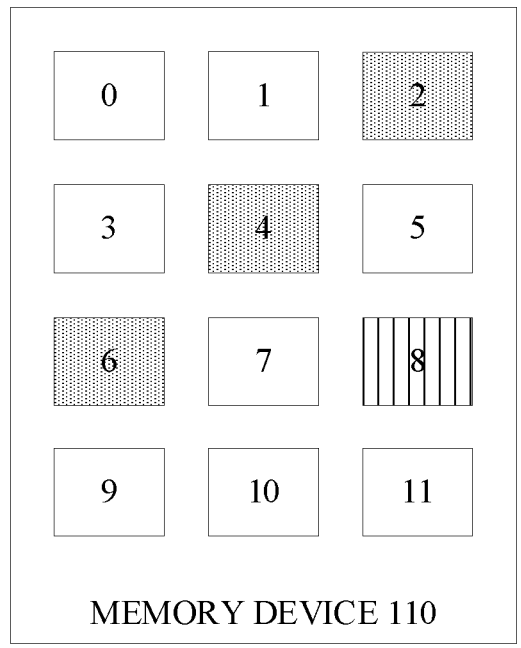
FIGS. 3A-3C are example block diagrams of an example non-volatile memory device in accordance with an embodiment of the disclosure.
Figure 3B:
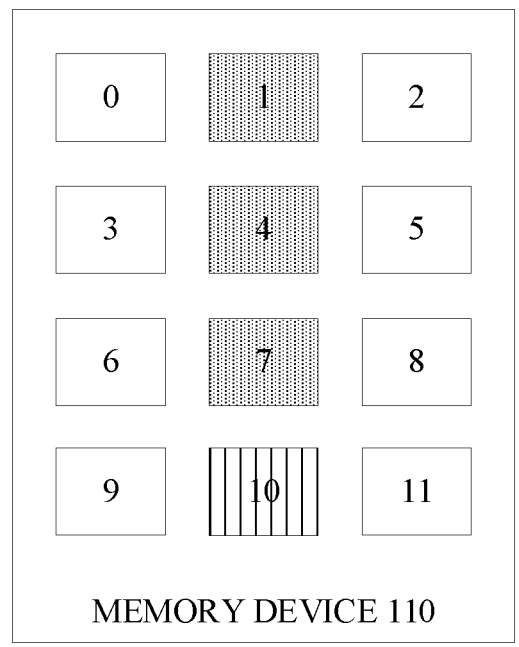
Figure 3C:
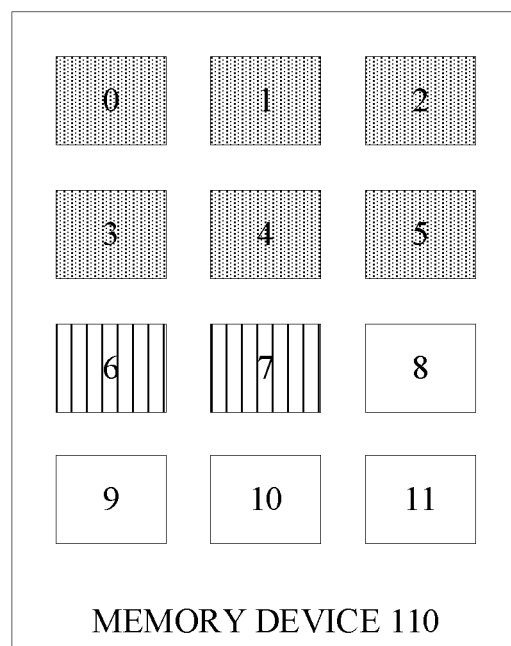

FIGS. 3A-3C are example block diagrams of an example non-volatile memory device in accordance with an embodiment of the disclosure. Non-volatile memory device 110 may include twelve blocks, with block 0 including data associated with addresses 0-99, block 1 including data associated with addresses 100-199, block 2 including data associated with addresses 200-299, block 3 including data associated with 300-399, block 4 including data associated with 400-499, block 5 including data associated with 500-599, block 6 including data associated with 600-699, block 7 including data associated with 700-799, block 8 including data associated with 800-899, block 9 including data associated with 900-999, block 10 including data associated with 1000-1099, and block 11 including data associated with 1100-1199.

FIG. 3A shows the blocks associated with example data requests received from accelerator core 106a, with the shaded blocks representing blocks associated with three data requests received from accelerator core 106a. The first data request from accelerator core 106a may be for data associated with addresses 200-299; the second may be for data associated with addresses 400-499; and the third may be for data associated with addresses 600-699. Learning module 204 may determine that the request pattern for data requests being transmitted from accelerator core 106a involves, starting at address 200, retrieving data associated with one hundred addresses and skipping data associated with the next one hundred addresses. After receiving the first three data requests from accelerator core 106a, learning module 204 may determine that the hot region for accelerator core 106a is associated with addresses 800-899 (shown with vertical lines) and may determine that data associated with addresses 800-899 is an appropriate pre-cache candidate.

FIG. 3B shows the blocks associated with example data requests received from accelerator core 106b, with the shaded blocks representing blocks associated with three data requests received from accelerator core 106b. The first data request from accelerator core 106ba may be for data associated with addresses 100-199; the second may be for data associated with addresses 400-499; and the third may be for data associated with addresses 700-799. Learning module 204 may determine that the request pattern for data requests being transmitted from accelerator core 106b involves, starting at address 100, retrieving data associated with one hundred addresses and skipping data associated with the next two hundred addresses. After receiving the first three data requests from accelerator core 106b, learning module 204 may determine that the hot region for accelerator core 106b is associated with addresses 1000-1099 (shown with vertical lines) and may determine that data associated with addresses 1000-1099 is an appropriate pre-cache candidate.

FIG. 3C shows the blocks associated with example data requests received from accelerator core 106c, with the shaded blocks representing blocks associated with three data requests received from accelerator core 106c. The first data request from accelerator core 106c may be for data associated with addresses 0-199; the second may be for data associated with addresses 200-399; and the third may be for data associated with addresses 400-599. Learning module 204 may determine that the request pattern for data requests being transmitted from accelerator core 106c involves, starting at address 0, retrieving data associated with two hundred addresses. After receiving the first three data requests from accelerator core 106c, learning module 204 may determine that the hot region for accelerator core 106c is associated with addresses 600-799 (shown with vertical lines) and may determine that data associated with addresses 600-799 is an appropriate pre-cache candidate.

If using the examples of FIGS. 3A-3C, learning module 204 also receives a pre-cache trigger associated with accelerator core 106c because accelerator core 106c has the highest hit ratio, learning module 204 may prioritize the pre-caching of the data associated with addresses 600-799 over other pre-cache candidates, depending on the available system resources. If in another example, learning module 204 receives pre-cache triggers associated with accelerator core 106c and accelerator core 106a, with accelerator core 106c having a higher hit ratio than accelerator core 106a, learning module 204 may prioritize the pre-caching of the data associated with addresses 600-799 over the data associated with addresses 800-899 and may prioritize the pre-caching of the data associated with addresses 800-899 over other pre-cache candidates, depending on the system resources. As indicated above, FIG. 3 is provided as an example. Other examples may differ from what is described in FIG. 3.

Figure 4:
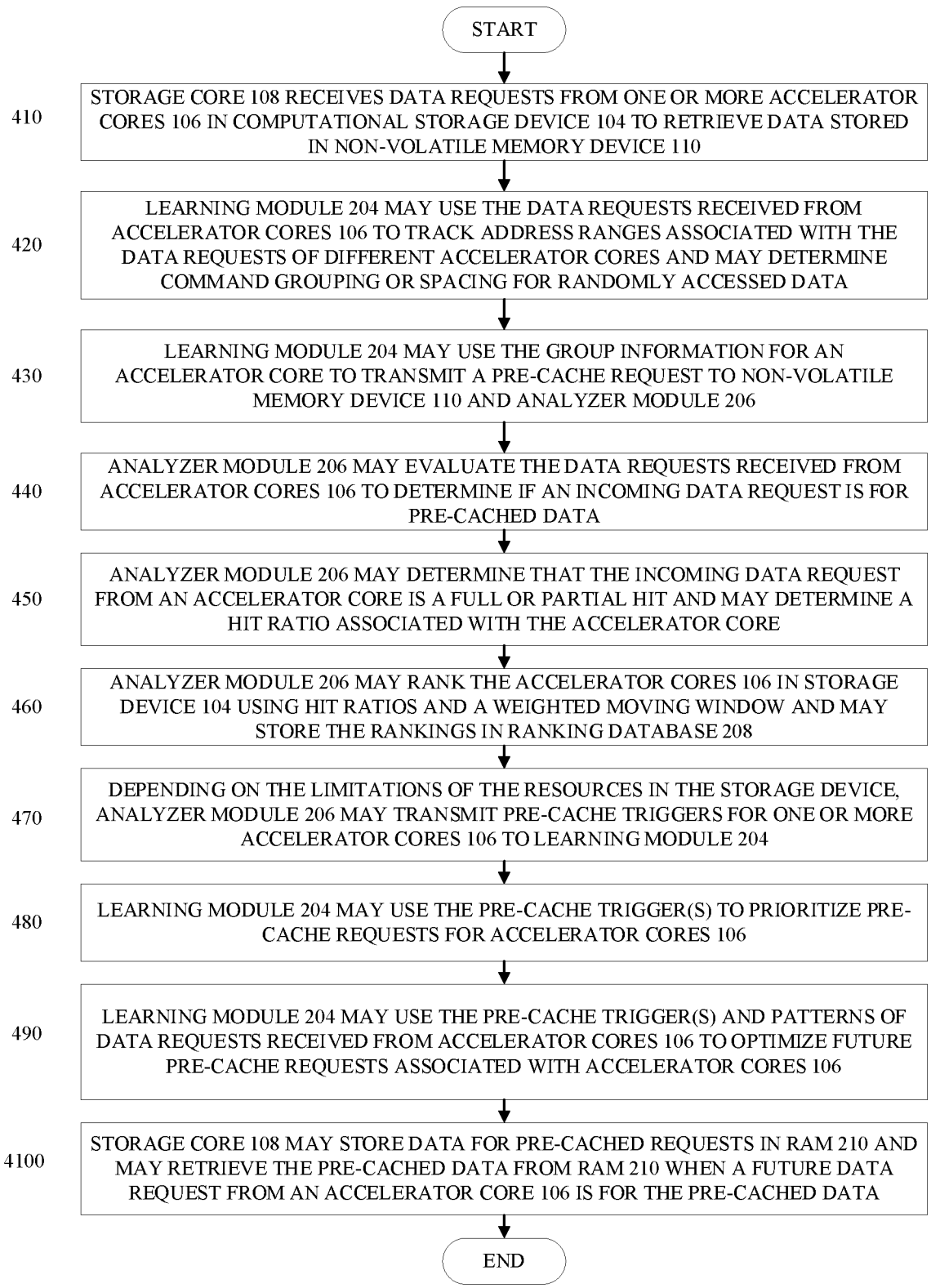
FIG. 4 is a flow diagram of an example process for pre-caching data associated with requests from accelerator cores in a computational storage device in accordance with some implementations.

FIG. 4 is a flow diagram of an example process for pre-caching data for requests from accelerator cores in a computational storage device in accordance with some implementations. At 410, storage core 108 receives data requests from one or more accelerator cores 106 in computational storage device 104 to retrieve data stored in non-volatile memory device 110. At 420, learning module 204 may use the data requests received from accelerator cores 106 to track address ranges associated with the data requests of different accelerator cores and may determine command grouping or spacing for randomly accessed data. At 430, learning module 204 may use the group information for an accelerator core to transmit a pre-cache request to non-volatile memory device 110 and analyzer module 206.

At 440, analyzer module 206 may evaluate the data requests received from accelerator cores 106 to determine if an incoming data request is for pre-cached data. At 450, analyzer module 206 may determine that the incoming data request from an accelerator core is a full or partial hit and may determine a hit ratio associated with the accelerator core. At 460, analyzer module 206 may rank the accelerator cores 106 in storage device 104 using hit ratios and a weighted moving window and may store the rankings in ranking database 208. At 470, depending on the limitations of the resources in the storage device, analyzer module 206 may transmit pre-cache triggers for one or more accelerator cores 106 to learning module 204.

At 480, learning module 204 may use the pre-cache trigger(s) to prioritize pre-cache requests for accelerator cores 106. At 490, learning module 204 may use the pre-cache trigger(s) and patterns of data requests received from accelerator cores 106 to optimize future pre-cache requests associated with accelerator cores 106. At 4100, storage core 108 may store data for pre-cached requests in RAM 210 and may retrieve the pre-cached data from RAM 210 when a future data request from an accelerator core 106 is for the pre-cached data.

Figure 5:
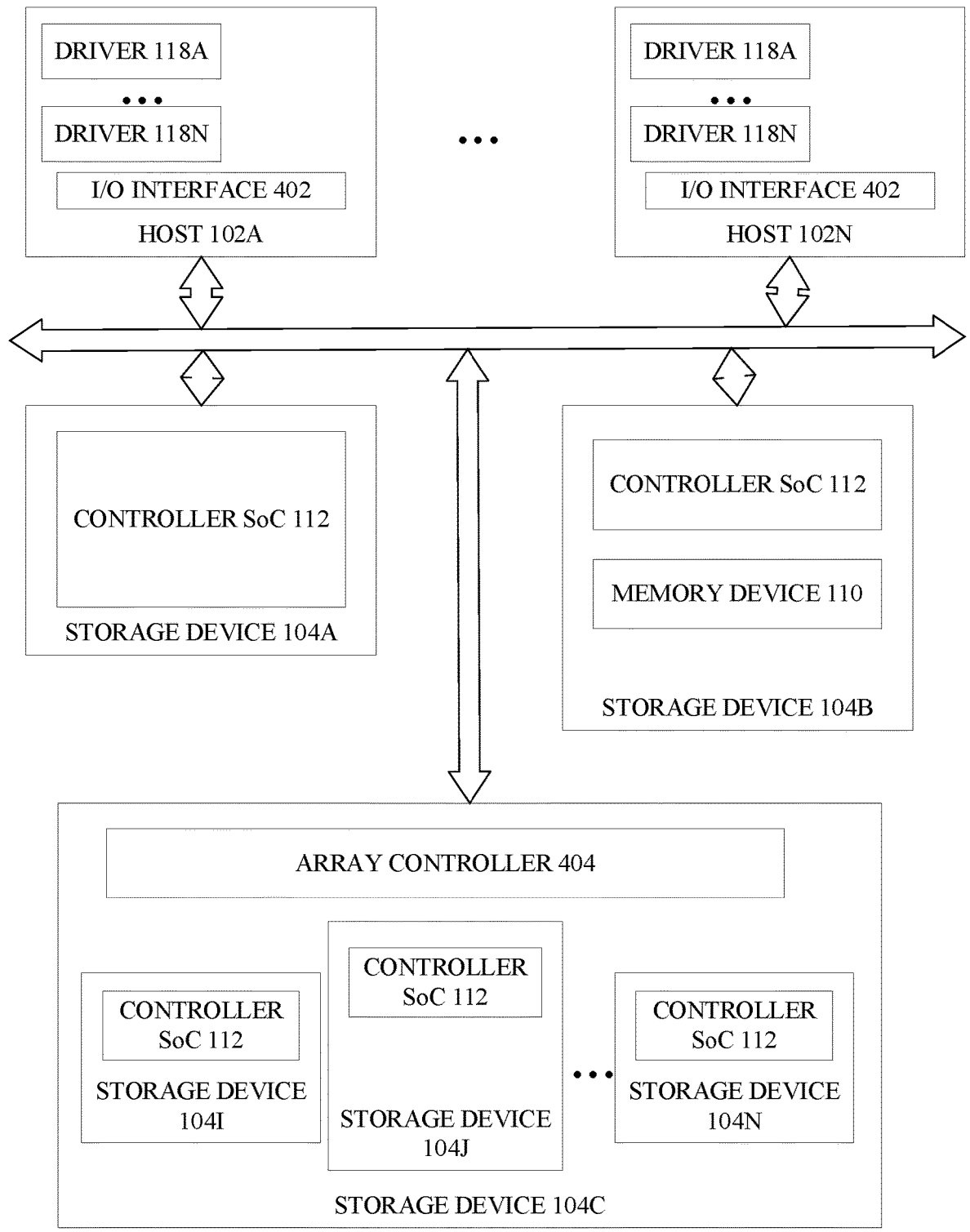
FIG. 5 is a diagram of an example environment in which systems and/or methods described herein are implemented.

FIG. 5 is a diagram of an example environment in which systems and/or methods described herein are implemented. As shown in FIG. 5, environment 500 may include hosts 102-102n (referred to herein as host 102), and storage devices 104a-104n (referred to herein as storage device 104).

Hosts 102 may include one or more computational storage drivers 118 to download and/or activate one or more computational storage functions on storage device 104. Computational storage functions on storage device 104 may also be activated at the time of manufacture and hosts 102 may also include a management and input/output (I/O) interface 402 through which host 102 may use one or more computational storage functions being executed on storage device 104.

Storage devices 104a-104n may include resources for storing and executing computational storage functions. In FIG. 5, storage device 104a may be, for example, a computational storage processor including controller SoC 202, wherein storage device 104*a* may execute one or more computational storage functions without providing persistent data storage. Storage device 104*b* may be, for example, a computational storage drive that may include controller SoC 202 and persistent data storage such as non-volatile memory device 110. Storage device 104*c* may be a computational storage array including, for example, an array controller 404 and an array of storage devices, shown as storage devices 104*i*-104*n*. Array controller 404 may provide virtualization to storage services, storage devices, and computational storage resources for the purpose of aggregating, hiding complexity, or adding new capabilities to lower-level storage resources. The computational storage resources in the computational storage array may be centrally located or distributed across computational storage devices and/or computational storage processors within the array.

Environment 500 may enable improvements in application performance and/or infrastructure efficiency through the integration of processing resources directly with storage device 104. Environment 500 may also enable parallel computation and/or alleviate constraints on existing processing, memory, storage, and input/output.

Storage devices 104 may be disposed on a peripheral bus, such as a peripheral component interconnect express (PCI Express or PCIe) bus, including a Non-Volatile Memory Express (NVMe) interface, a Serial Advanced Technology Attachment (SATA) bus, a Parallel Advanced Technology Attachment (PATA) bus, a Small Computer System Interface (SCSI) bus, a Serially Attached SCSI (SAS) bus, a FireWire bus, a Fibre Channel connection, a Universal Serial Bus (USB), a PCIe Advanced Switching (PCIe-AS) bus, or the like.

Devices of environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
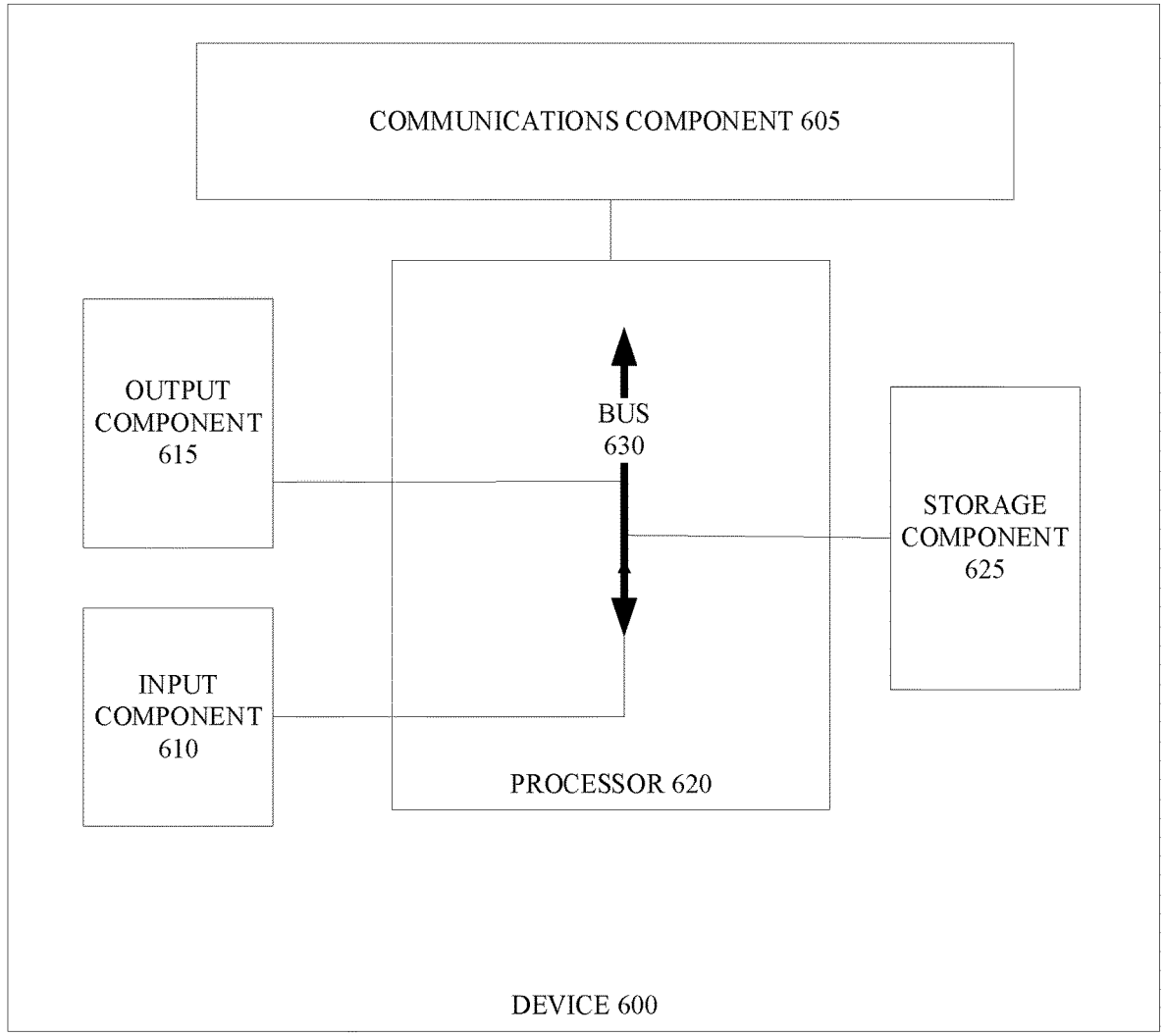
FIG. 6 is a diagram of example components of the host of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A storage device comprising:
a memory device to store data;
a plurality of accelerator cores to perform computational storage functions; and
a storage core to receive data requests to access data stored on the memory device from a requesting accelerator core, to learn a request pattern associated with the data requests, to analyze usage of previously cached data by the requesting accelerator core, and to optimize pre-cache operations based on the request pattern and the usage of previously cached data associated with the requesting accelerator core.

2. The storage device of claim 1, wherein the storage core comprises:
a learning module to use a grouping of data in the data requests to determine the request pattern, determine a hot region associated with the requesting accelerator core, generate a pre-cache request associated with the hot region, and send the pre-cache request to the memory device and an analyzer module; and
the analyzer module to evaluate the data requests from the requesting accelerator core and the pre-cache request, to determine if an incoming data request from the requesting accelerator core is for pre-cached data, and to transmit a pre-cache trigger for at least one highly ranked accelerator core to the learning module for use in generating of an upcoming pre-cache request generated by the learning module.

3. The storage device of claim 2, wherein the learning module tracks address ranges from the data requests to determine the request pattern for the requesting accelerator core and uses the request pattern to determine and transmit the pre-cache request for at least one of logical data and corresponding control data associated with the requesting accelerator core.

4. The storage device of claim 2, wherein the learning module chooses at least one best-fit pre-cache candidate from data requests received from the plurality of accelerator cores and generates the upcoming pre-cache request for at least one of logical data and corresponding control data associated with the data requests from the best-fit pre-cache candidate.

5. The storage device of claim 2, wherein the analyzer module determines that the incoming data request is a hit if the incoming data request is for data in a previously received pre-cache request and determines that the incoming data request is a miss if the incoming data request is not for data in the previously received pre-cache request.

6. The storage device of claim 2, wherein the analyzer module calculates a hit ratio of each of the plurality of accelerator cores based on if an associated incoming data request is a hit and ranks the plurality of accelerator cores according to associated hit ratios.

7. The storage device of claim 2, wherein the analyzer module calculates a hit ratio and a ranking for the requesting accelerator core using a weighted moving window, wherein the analyzer module gives a higher weight to a newer hit than an older hit.

8. The storage device of claim 2, further comprising a ranking database to store a ranking of hit ratios for the plurality of accelerator cores, wherein the analyzer module updates the ranking database to reflect changes in the hit ratios for the plurality of accelerator cores.

9. The storage device of claim 2, wherein the pre-cache trigger is associated with at least one highly ranked accelerator core and is dependent on resources of the storage device.

10. The storage device of claim 2, further comprising a controller to perform at least one of control operations for one or more components of the storage core, control interactions between the plurality of accelerator cores and the storage core, and manage writing data to the memory device.

11. The storage device of claim 1, wherein the memory device is at least one non-volatile memory device configured in a plurality of blocks.

12. A method for generating pre-cache requests for data stored on a memory device in a storage device, the method comprising:
   transmitting, by an accelerator core to a storage core in the storage device, data requests to access data stored on the memory device, wherein the accelerator core is one of a plurality of accelerator cores to perform computational storage functions;
   receiving, by the storage core, the data requests from the accelerator core;
   learning by the storage core, a request pattern associated with the data requests;
   analyzing, by the storage core, usage of previously cached data by the accelerator core; and
   optimizing, by the storage core, pre-cache operations based on the request pattern and the usage associated with the accelerator core and generating pre-cache requests using optimized pre-cache operations.

13. The method of claim 12, wherein the learning comprises:
   using a grouping of data in the data requests to determine the request pattern;
   determining a hot region associated with the accelerator core;
   generating a pre-cache request associated with the hot region; and
   sending the pre-cache request to the memory device.

14. The method of claim 13, wherein the analyzing comprises:
   evaluating, the data requests from the accelerator core and the pre-cache request, to determine if an incoming data request is for pre-cached data;
   creating a pre-cache trigger for at least one highly ranked accelerator core in response to the evaluating; and
   generating an upcoming pre-cache request based on the pre-cache trigger.

15. The method of claim 14, wherein the analyzing comprises:
   determining that the incoming data request is a hit if the incoming data request is for data in a previously received pre-cache request; and
   determining that the incoming data request is a miss if the incoming data request is not for data in the previously received pre-cache request.

16. The method of claim 14, wherein the analyzing comprises:
   calculating a hit ratio of each of the plurality of accelerator cores based on if an associated incoming data request is a hit;
   ranking the plurality of accelerator cores according to associated hit ratios using a weighted moving window, wherein a higher weight is given to a newer hit than an older hit;
   storing a ranking of hit ratios for the plurality of accelerator cores in a ranking database; and
   updating the ranking database to reflect changes in the hit ratios for the plurality of accelerator cores.

17. The method of claim 13, wherein the learning comprises:
   tracking address ranges from the data requests to determine the request pattern for the accelerator core; and
   using the request pattern to determine and transmit the pre-cache request for at least one of logical data and corresponding control data associated with the accelerator core.

18. The method of claim 13, wherein the learning comprises:
   choosing at least one best-fit pre-cache candidate for data requests received from the plurality of accelerator cores;
   and generating the pre-cache request for at least one of logical data and corresponding control data associated with the data requests for the best-fit pre-cache candidate.

19. A storage device communicatively coupled to a memory device, the storage device comprising:
   a plurality of accelerator cores to perform computational storage functions;
   a storage core to receive data requests to access data stored on the memory device from a requesting accelerator core, to learn a request pattern associated with the data requests, to analyze usage of previously cached data by the requesting accelerator core, and to optimize pre-cache operations based on the request pattern and the usage of previously cached data associated with the accelerator core; and
   a controller to perform at least one of control operations for one or more components of the storage core, control interactions between the plurality of accelerator cores and the storage core, and manage writing data to the device memory.

20. The storage device of claim 19, wherein the storage core comprises:
   a learning module to use a grouping of data in the data requests to determine the request pattern, determine a hot region associated with the requesting accelerator core, generate a pre-cache request associated with the hot region, and send the pre-cache request to the memory device and an analyzer module; and
   the analyzer module to evaluate the data requests from the requesting accelerator core and the pre-cache request, to determine if an incoming data request is for pre-cached data, and to transmit a pre-cache trigger for at least one highly ranked accelerator core to the learning module for use in generating of an upcoming pre-cache request generated by the learning module.

* * * * *